United States Patent
Pinault

(10) Patent No.: US 10,678,468 B2
(45) Date of Patent: Jun. 9, 2020

(54) METHOD AND SYSTEM FOR DYNAMIC DISPERSED SAVING

(71) Applicant: THE ROBERTO GIORI COMPANY LTD., Pully (CH)

(72) Inventor: Francis Pinault, Juvignac (FR)

(73) Assignee: THE ROBERT GIORI COMPANY LTD., Pully (CH)

( * ) Notice: Subject to any disclaimer, the term of this patent is extended or adjusted under 35 U.S.C. 154(b) by 21 days.

(21) Appl. No.: 15/766,409

(22) PCT Filed: Oct. 7, 2016

(86) PCT No.: PCT/EP2016/074104
§ 371 (c)(1),
(2) Date: Apr. 6, 2018

(87) PCT Pub. No.: WO2017/060495
PCT Pub. Date: Apr. 13, 2017

(65) Prior Publication Data
US 2018/0284991 A1   Oct. 4, 2018

(30) Foreign Application Priority Data
Oct. 8, 2015 (EP) ..................................... 15306582

(51) Int. Cl.
*G06F 12/00* (2006.01)
*G06F 13/00* (2006.01)
(Continued)

(52) U.S. Cl.
CPC .............. *G06F 3/065* (2013.01); *G06F 3/062* (2013.01); *G06F 3/064* (2013.01); *G06F 3/067* (2013.01);
(Continued)

(58) Field of Classification Search
CPC ........... G06F 3/065; G06F 3/067; G06F 8/453
(Continued)

(56) References Cited

U.S. PATENT DOCUMENTS

2006/0020569 A1   1/2006   Goodman et al.
2007/0073990 A1   3/2007   Snaman et al.
(Continued)

FOREIGN PATENT DOCUMENTS

WO   WO 2014/010016   1/2014
WO   WO 2014/199553   12/2014

OTHER PUBLICATIONS

Wikipedia, Public-key cryptography, Jan. 4, 2004 (Year: 2004).*
International Search Report, PCT/EP2016/074104; dated Nov. 7, 2016.

*Primary Examiner* — Edward J Dudek, Jr.
*Assistant Examiner* — Sidney Li
(74) *Attorney, Agent, or Firm* — Young & Thompson

(57) ABSTRACT

In the field of IT, and in particular to distributed data storage across a plurality of storage servers, the disclosed distributed backup method includes the following steps: dividing the data so as to obtain data blocks; determining, for each block, a particular server from the plurality of storage servers; and memorising each block in the determined server. The determination of the particular server is a function of a current time instant. It can also be a function of a private key of the user. The key is used to form a mask. The latter is offset as a function of the current time instant. Then, the offset mask and the complementary mask thereof are applied, respectively, to two server distribution tables in order to identify the servers to be used for each of the data blocks. The blocks can change servers at each new time instant.

20 Claims, 7 Drawing Sheets

(51) Int. Cl.
*G06F 13/28* (2006.01)
*G06F 3/06* (2006.01)
*G06F 11/14* (2006.01)

(52) U.S. Cl.
CPC .......... *G06F 3/0614* (2013.01); *G06F 3/0631* (2013.01); *G06F 11/1464* (2013.01)

(58) Field of Classification Search
USPC ........................................................ 711/162
See application file for complete search history.

(56) References Cited

U.S. PATENT DOCUMENTS

2012/0259901 A1* 10/2012 Lee ..................... G06F 16/27
707/827
2016/0147838 A1* 5/2016 Kamimura ............. G06F 3/061
707/812

* cited by examiner

Fig. 7

METHOD AND SYSTEM FOR DYNAMIC DISPERSED SAVING

FIELD OF THE INVENTION

The present invention concerns the computing field, and more particularly a system and a method of storing a data item associated with a user in a computer network comprising a plurality of storage servers. In other words, it is a distributed or dispersed storage or saving of data on a network.

Context of the Invention

The idea of using an extended computer network, such as the Internet, to provide security for the storage of data is not new. In the journalistic article "Using the Internet as a dispersed storage system" (http://www.lemondeinformatique.fr/actualites/lire-utiliser-internet-comme-systeme-de-stockage-reparti-22932.html), it was already indicated that the idea, equally simple as ambitious, of a certain company, consisted in cutting a volume of data to archive into slices and in dispersing their storage over all the resources available on the Internet. This approach, baptized DSG (for "dispersed storage grid") relies on an algorithm developed at the MIT at the end of the 70's. It allows the data to be cut into slices, and gives each of them the possibility of regenerating lost segments. The reliability of the system gave it a record level of availability: less than one hour of unavailability over a million years.

Today, the storage or the saving of data on the Cloud is widespread.

Nevertheless, despite numerous techniques for data encryption, the level of security offered by the existing solutions in terms of confidentiality of data specific to a user may prove unsatisfactory. In particular, a malicious person may attempt to recover, from the storage servers used, the data blocks forming an initial secret data item, without effective countermeasures being taken in particular because the recursion of access to that data item may over time and with sophisticated spying devices, enable data encryptions to be foiled.

Document US 2007/073990 describes a distributed storage of blocks forming a file, on servers. A list of servers is determined from a seed associated with the file. When a server is added or removed, a new allocation of the blocks to the available servers is made, while limiting redistribution of the blocks solely to the blocks concerned by the added or removed server according to that new allocation.

SUMMARY OF THE INVENTION

An objective of the present invention is thus to improve the provision of security for an item of personal data at the time of its storage dispersed over a plurality of servers.

To that end, a first aspect the present invention concerns a method of storing a data item associated with a user in a computer network comprising a plurality of storage servers, the method comprising the following steps:
dividing the data item to obtain a plurality of data blocks;
determining, for each data block, a respective server from a plurality of storage servers; and
storing each data block on the respective storage server, characterized in that the determination of the respective server is according to a current time instant.

In particular, the determination of the respective server according to a current time instant may be carried out for each data block, such that the storage server used to store each respective data block varies periodically over time.

In a complementary manner, according to a second aspect, the invention concerns a system (which may be integrated into a simple user terminal) for storing a data item associated with a user in a computer network comprising a plurality of storage servers, the system comprising at least one microprocessor configured to execute, in an execution environment of the system, the following steps:
dividing the data item to obtain a plurality of data blocks;
determining, for each data block, a respective server from a plurality of storage servers; and
storing each data block on the respective storage server, characterized in that the determination of the respective server is according to a current time instant.

The method or the system according to the invention thus makes it possible to increase the provision of security for personal data, for example confidential data, whether or not encrypted, or personal programs.

This increased provision of security is obtained by the dependency on time of the storage server used for storing each data block resulting from the division of the personal data item. It follows that the storage server used to store a particular data block may vary over time, that is to say that it is determined according to one or more laws of dynamic dispersion. The task of locating and retrieving data blocks is thus rendered substantially more complex for a malicious person.

Optional features of the method according to the invention are furthermore defined in the dependent claims. The system according to the invention may also comprise means configured to implement these optional features.

In an embodiment, a new respective storage server is determined, at each new time instant, for each data block, so as to store the data block at a new storage server at each new time instant.

This provision specifies the dependency, on time, of the determination of the server to use.

In a particular embodiment, the method further comprises the following steps in response to a request for access to the data item associated with the user:
identifying storage servers that store, at a given time instant, the data blocks;
retrieving the data blocks from the respective storage servers so identified, to reform said data item; and
in case of detection of an error in the data item reformed from the retrieved data blocks, identifying new storage servers storing, at a following time instant (the one immediately following the given time instant), the data blocks, then retrieving the data blocks from the new respective storage servers so identified, to reform said data item.

This provision makes it possible to deal with the discontinuity in storage of the data blocks when a change in time instant occurs. As a matter of fact, depending on whether the request for access to the data item received in the vicinity of this change in time instant is processed more quickly or less quickly, the data blocks may have been moved from one server to another, according to the new dispersed storage scheme applicable at the instant T+1.

Thus, the data item is reconstituted using the scheme applicable at the instant T, and if that data item is erroneous (lack of coherency, error on an identification criterion for example such as a user identity in the reconstituted data item, etc.), a reconstitution is carried out using the scheme applicable at the instant T+1.

In another embodiment, the determination of the respective server is furthermore according to a binary private key associated with the user. This may be any particular encryption key associated with the user, which is used in its binary form.

This provision makes it possible to encrypt the dispersion scheme of the storage servers according to each user, and thus render more complex, for a malicious person, the operations to implement to identify the storage location of each of the data blocks.

According to a particular embodiment, the step of determining the storage servers comprises a step consisting of applying the binary key as a mask to a first dispersion table of the servers to identify storage servers to use for some of the respective data blocks, said first dispersion table of the servers associating a server with each data block.

The knowledge of the key thus becomes indispensable for the identification of each storage server used.

According to a particular feature, the step of determining the storage servers further comprises a step consisting of applying a complement of the binary key as a mask to a second dispersion table of the servers to identify storage servers to use for the other respective data blocks. In particular, said second dispersion table of the servers may associate a server with each data block and may be formed from a same elementary table as the first dispersion table of the servers. For example, the dispersion tables are generated by repetition (and concatenation) of the elementary table, the second dispersion table being the continuation of the first dispersion table having regard to the repetition of the elementary table.

These provisions make it possible to determine the storage servers to use very securely.

According to a particular embodiment, the mask formed from the binary key is offset relative to the first or second dispersion table of the servers by a number of positions according to the current time instant, before being applied to the first or second dispersion table of the servers. The current time instant is thus used as an interfering reference in the application of the mask (binary key of the user), increasing the security of the dispersed storage of the personal data.

According to another embodiment, the mask is formed by a repetition (possibly partial) of the binary key so as to attain the size of the first or second dispersion table of the servers, that is to say the number of data blocks to store.

A malicious person will then have to know the user's key to attempt to locate the servers where each of the data blocks are stored.

According to another particular embodiment, the method further comprises a step of determining an elementary table of dispersion of the servers by duplication of which the dispersion table or tables of the servers are obtained, in which method the step of determining the elementary table is according to a performance index associated with each storage server and according to a trustworthiness index associated with the geographical location of each storage server.

Thus, a strategy of prioritization of the use of certain servers may be implemented, in order for example to give precedence to the servers with good performance and/or that are located in geographical zones of low risk (for example earthquake risk or geopolitical risk).

According to a particular feature, the length of the elementary table is according to the sum of weights associated with the storage servers, the weight associated with a storage server being determined based on the performance and trustworthiness indices of the storage server considered.

According to another particular feature, the step of determining the elementary table comprises the following steps:

determining, for each storage server, a repetition frequency of an occurrence (for example via an identifier) of the storage server in the elementary table according to the weight associated with said storage server considered;

filling the elementary table by repeating, for each server iteratively considered and according to its determined repetition frequency, an occurrence of the server within the elementary table until a repetition number equal to the weight associated with the server considered is attained.

The elementary table thus makes it possible to obtain a complex and interleaved dispersion of the servers, in proportions equal to their respective weights, that is to say their trustworthiness and performance indices. Thus, such an elementary table is complex to recreate for a malicious person, while ensuring equity between the servers taking into account their characteristics.

It is to be noted that on forming the elementary table, if a position (in the elementary table) is already occupied by an occurrence of a storage server when a new repetition is made of another storage server, it may be decided to offset the occurrence of that other storage server until the next free position, then to recommence the repetition starting from that new position. To attain the number of repetitions/occurrences desired despite the end of the elementary table having been reached, it may be provided to continue the repetition by looping again on the start of the elementary table. For example, if the length of the elementary table is equivalent to the sum of the weights, it is necessary, to fill the whole elementary table, for each of the servers to be present as a number of occurrences equal to its own weight.

In an embodiment of the invention, the step of dividing the data item comprises the following steps:

dividing the data item into elementary data blocks;
duplicating the elementary blocks as duplicated blocks;
interleaving the duplicated blocks so as to obtain said plurality of data blocks.

This provision makes it possible to introduce redundancy of the elementary blocks forming the initial personal data item, and thereby enable the storage reliability in the system to be increased.

BRIEF PRESENTATION OF THE DRAWINGS

Still other particularities and advantages of the invention will appear in the following description, illustrated by the accompanying drawings, in which:

FIG. 7 illustrates an example of implementation of the steps of FIG. 6.

DETAILED DESCRIPTION OF EMBODIMENTS OF THE INVENTION

Figure 1:
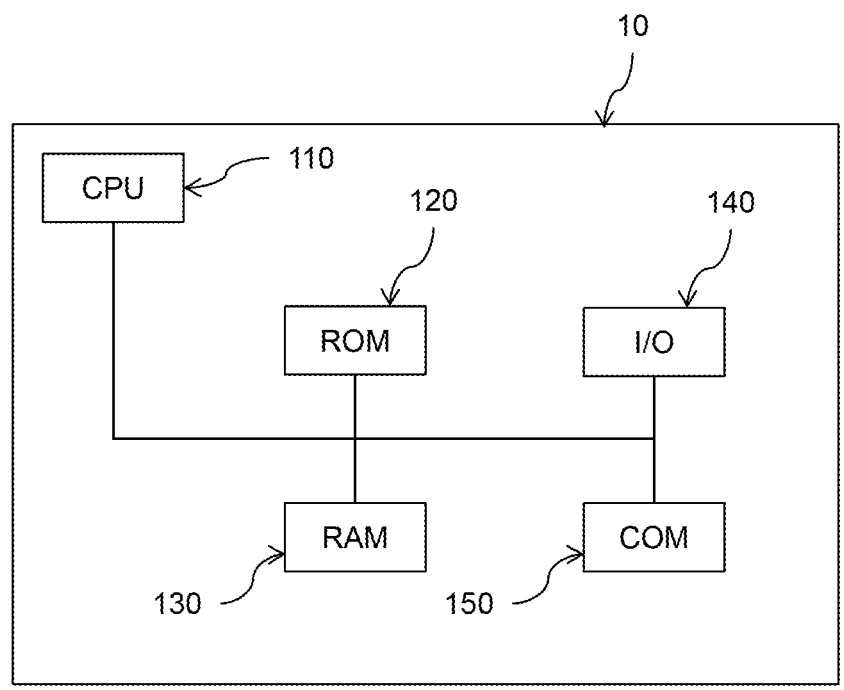
FIG. 1 illustrates a hardware architecture example in which the present invention may be implemented, in particular in the form of computer programs.

FIG. 1 illustrates an example of hardware architecture in which the present invention may be implemented, in particular in the form of computer programs. By way of example, this hardware architecture may form part of a user terminal or device, such as a computer which may or may not be an on-board computer, a portable computer, mobile terminal, mobile tablet, or form part of a server providing dispersed saving services for data and access to those data.

The hardware architecture 10 comprises in particular a communication bus 100 to which are connected:

a processing unit 110, denoted CPU (for Central Processing Unit), able to comprise one or more processors;

at least one non-volatile memory 120 for example ROM (for Read Only Memory), EEPROM (for Electrically Erasable Read Only Memory) or Flash, for storing computer programs for the implementation of the invention and parameters that may be used for it;

a primary storage memory 130 or cache memory or volatile memory for example RAM (for Random Access Memory), configured for storing the executable code of processes according to embodiments of the invention, and for storing registers configured for storing, at least temporarily, variables and parameters necessary for the implementation of the invention according to embodiments;

an I/O interface 140 (I/O standing for Input/Output), for example a screen, a keyboard, a mouse or another pointing device such as a touch screen or a remote control enabling a user to interact with the system via a graphical interface; and a communication interface COM 150 configured to exchange data for example with storage servers via a communication or computer network.

The codes for instructions of the program stored in non-volatile memory 120 are loaded into RAM memory 130 for them to be executed by the processing unit CPU 110.

The non-volatile memory 120 also stores confidential information of the user, for example a private key in binary form. Of course, in order to improve the protection of such a private key, this may be stored in a SE (standing for Secure Element) of chip card type, equipping the system according to this hardware architecture or for instance on an HSM (standing for Hardware Security Module).

The present invention lies within the context of the dispersed saving (or storage) of data on storage servers of a communication network, typically an extended computer network, such as the Internet.

Figure 2:
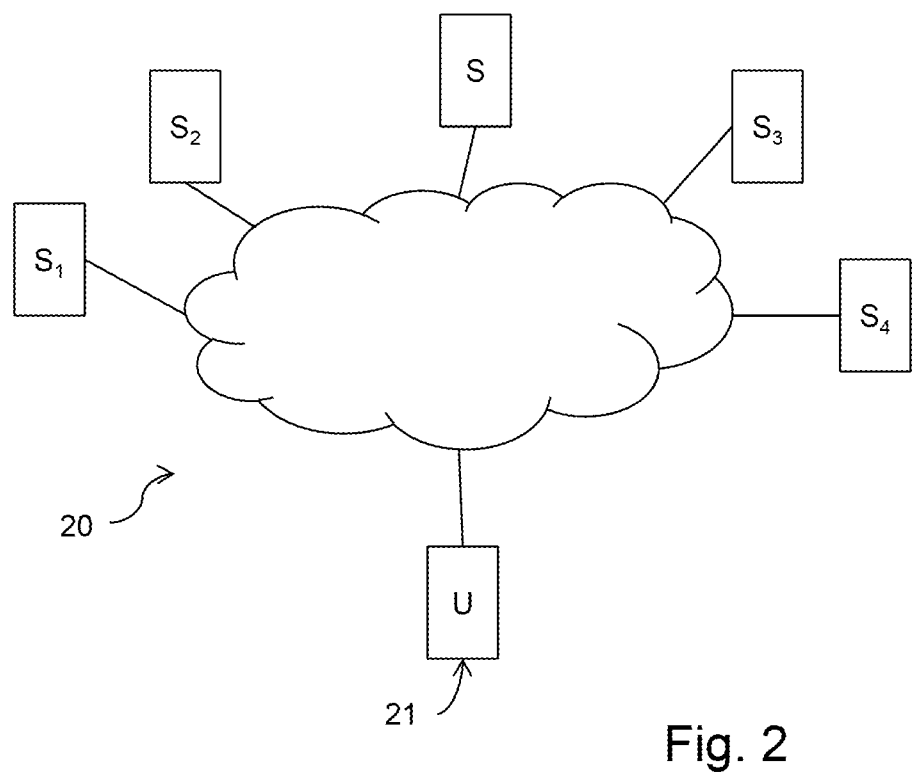
FIG. 2 illustrates a computer network example comprising a plurality of storage servers in which the invention can be implemented.

FIG. 2 illustrates an example of a computer network 20 comprising a plurality of M storage servers $S_x$. In the non-limiting example of the Figure, four (M=4) storage servers $S_1$, $S_2$, $S_3$ and $S_4$ are represented. The servers are synchronized on the same reference clock.

A user terminal 21, having the hardware architecture of FIG. 1, enables a user to seek to obtain the saving of a personal data item, sometimes confidential, whether encrypted or not, and to access that personal data item once it has been stored in dispersed manner in the network 20.

The user terminal 21 may implement the present invention to manage the dispersed storage of such a personal data item and its later access. As a variant, the user terminal 21 can access a service for distributed saving of a data item and for later access to that data item, offered by a server S of the network 20. In both cases, all the parameters (trustworthiness and performance indices, user keys, etc.) discussed below may be stored on such a server S, and be retrieved, if necessary, by the user terminals.

The general principles for dispersed saving of a data item include dividing the data item to obtain a plurality of data blocks; determining, for each data block, a respective server from among the plurality of storage servers; and storing each data block at the respective storage server.

In this context, the present invention provides for increasing the protection, and thus the security, of the data item so stored in accordance with these solutions, by performing a determination of each respective server according to a current time instant, that is to say according to the time.

A location of each data block results from this which may vary over time, making their retrieval by a malicious person more difficult.

Figure 3:
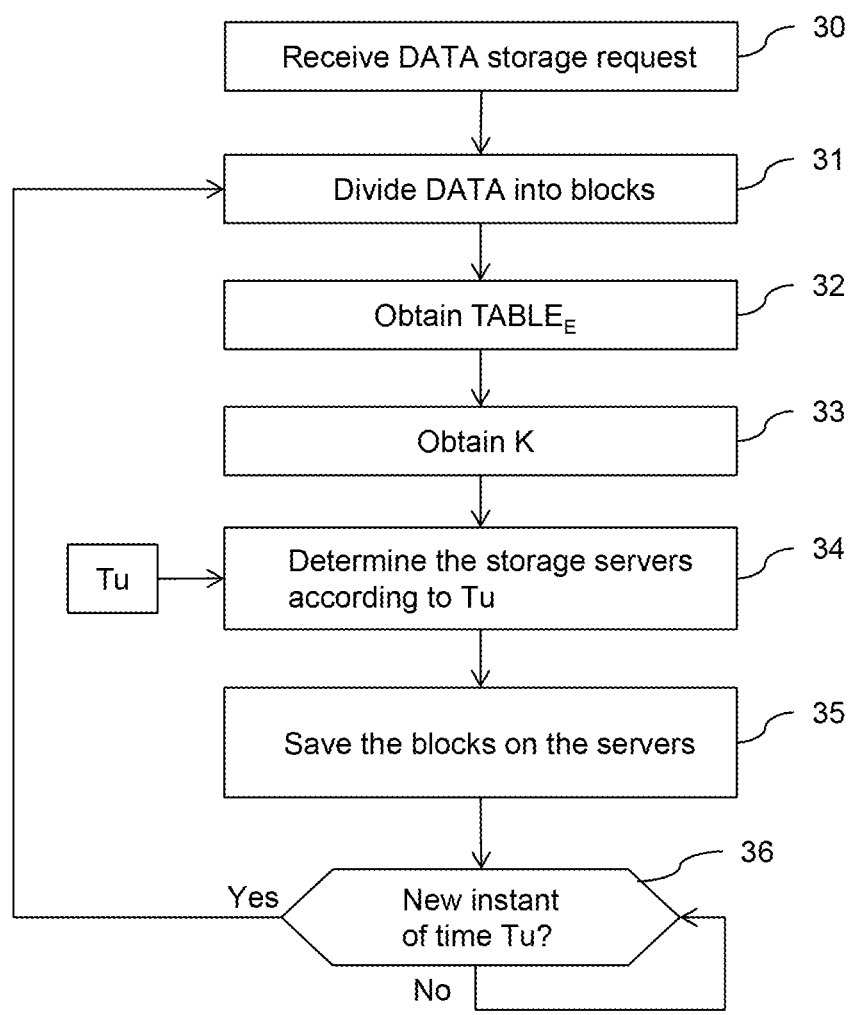
FIG. 3 illustrates, using a computer flowchart, general steps of a method of dispersed saving of a data item according to embodiments of the invention.

FIG. 3 illustrates, using a computer flowchart, general steps of an exemplary method according to embodiments of the invention. These steps are implemented in a system according to the invention, which may be the user terminal 21 or the server S of FIG. 2.

At step 30, a request for storage of a personal data item DATA is received from the user (via the user terminal 21 if applicable).

This data item is personal in that it is attached to a user or group of users. It may be constituted by a plurality of elementary data, which are for example confidential. Typically, the personal data item is encrypted.

The personal data item DATA forms a file of size LENGTH.

At step 31, the data item DATA is divided to obtain a plurality of data blocks. This step subdivides into three sub-steps: dividing the data item DATA into elementary data blocks $D_1$-$D_{Nb}$; duplicating the elementary blocks into duplicated blocks $D'_1$-$D'_{Nb'}$ to provide a sufficient level of redundancy; and interleaving the duplicated blocks to improve the reliability of the storage mechanism.

The data item DATA may be divided into Nb blocks of constant size Lfixed, applicable to all data items DATA over time: Nb=⌈LENGTH/Lfixed⌉, where ⌈ ⌉ is the function yielding the ceiling integer value.

As a variant, the data item DATA may be divided into a plurality of blocks of the same size Lvar, this block size being variable in that it may depend on one or more parameters, for example chosen from the following parameters: the size LENGTH of the data item DATA, the user, the operator of the service for dispersed saving and for accessing the data, etc. The number of blocks obtained is then:

$$Nb=\lceil LENGTH/Lvar \rceil.$$

The user of variable lengths further improves the provision of security for the data item to save.

By way of example, the variability of the size of the block according to the size LENGTH of the data item DATA may follow one of the following formulae:

$$Lvar=\not\subset Lmin+(LENGTH/Nbmax)\rceil,$$

where Nbmax is a predefined parameter and Lmin is a predefined minimum integer size. In this case, the number Nb of data blocks obtained tends towards Nbmax the greater the size of the data item DATA;

$$Lvar=\sqrt{(LENGTH)} \text{ for } LENGTH<Nbmax^2$$

$$Lvar=LENGTH/Nbmax \text{ for } LENGTH \geq Nbmax^2,$$

in which case the number Nb of data blocks obtained has the value min (⌈√(LENGTH)⌉, Nbmax), and thus tends towards Nbmax the greater the size of the data item DATA.

By way of example, the variability of the size of the block according to the user may consist in using a unique identifier ID of the user (for example a social security number, a passport or identity card number, etc.) which is normalized in a predefined range [0;Nbmax], to compute that length:

Nb=ID−Nbmax.⌊ID/Nbmax⌋, where ⌊ ⌋ is the function yielding the floor integer value, and thus:

$$Lvar=\lceil LENGTH/Nb \rceil=\lceil LENGTH/(ID-Nbmax.\lfloor ID/Nbmax \rfloor) \rceil.$$

As a variant, an integer number from the range [0;Nbmax] may be attributed randomly to each user and serve to define the value Nb. The variable size then directly follows: Lvar=⌈LENGTH/Nb⌉.

By way of example, the variability of the size of the block according to an operator may consist in providing different levels (value Nb) of division of the data item according to options of subscription or performance. The recourse to a division into a large number of blocks proves to give more security, but requires more calculations as described later. Thus, such a level of division may be reserved for premium subscribers.

Of course, these different examples may be combined together to produce variable lengths for cutting up the data item DATA into data blocks $D_1$-$D_{Nb}$.

Optionally, these data blocks $D_1$-$D_{Nb}$ may be duplicated to provide a redundancy of the data, making the reconstitution of the data item DATA more reliable. In an embodiment, the redundancy law may be fixed, defining the number of duplications RD by a fixed number, for example 3.

According to another embodiment, the redundancy law applied may be variable in that it may depend on one or more parameters, for example according to trustworthiness indices $CS_i$ attributed to the M servers $S_i$. By way of example, the integer number of duplications may have the value:

$$RD=RDmax+av(CS_i)_{i=1 \ldots M}\lfloor (\Sigma CS_i)/M+1 \rfloor$$

with RDmin≤RD≤RDmax; RDmin and RDmax being two predefined values; and av( ) being the function which yields the median or mean value.

Given the number RD of duplications, Nb'=RD.Nb blocks $D'_1$-$D'_{Nb'}$ are obtained from the n elementary blocks $D_1$-$D_{Nb}$.

Also optionally, the m blocks $D'_1$-$D'_{Nb'}$ may be interleaved in order to improve the reliability of the saving system having regard to the errors occurring in the processing of the blocks $D'_1$-$D'_{Nb'}$.

By way of example, the interleaving of the data blocks $D'_1$-$D'_{Nb'}$ produced may be monotonic of depth P, meaning that each group of P elementary blocks $D_i$ is duplicated RD times. For example, for RD=3 and P=4, each group of 4 blocks is considered successively as follows:

$D_1D_2D_3D_4\ D_1D_2D_3D_4\ D_1D_2D_3D_4\ D_5D_6D_7D_8\ D_5D_6D_7D_8\ D_5D_6$ . . .

As a variant, complex interleaving of depth P may be implemented, meaning that for each group of P elementary blocks, their duplications are mixed. For example, for RD=3 and P=6:

$D_1D_4D_2D_5D_3D_6\quad D_5D_2D_4D_1D_6D_3\quad D_6D_1D_3D_4D_2D_5\ D_8D_{10}D_7D_9D_{11}D_{12}$ . . .

Further to step 31, an elementary table of dispersion of the servers $S_i$, denoted $TABLE_E$, is obtained at step 32.

The elementary table $TABLE_E$ consists of an ordered plurality of $L_{TABLE}$ entries, each identifying one of the servers $S_i$.

This elementary table $TABLE_E$ may be a predefined table retrieved from non-volatile memory of the system. As a variant, it may be determined according to the method of FIG. 6 described below in order in particular to give precedence to servers that are trustworthy or which give good performance.

An example of elementary table of length $L_{TABLE}$=21 is given here solely for the purposes of illustration, in which there is only reported the index i of the server $S_i$ when M=4:

| 1 | 2 | 3 | 4 | 3 | 1 | 3 | 4 | 2 | 3 | 1 | 3 | 4 | 3 | 4 | 1 | 2 | 3 | 4 | 3 | 4 |
|---|---|---|---|---|---|---|---|---|---|---|---|---|---|---|---|---|---|---|---|---|

Further to step 32, a private key of the user is obtained at step 33. This is preferably a cryptographic key obtained from an elliptic curve. This key, denoted K, is stored securely in the system implementing the invention, for example using a secure element, of chip card type.

As disclosed below, the private key K is used to determine the servers to use to store each block $D'_i$.

Next at step 34, a respective storage server is determined, for each data block $D'_i$, from among the plurality of storage servers, according to a current time instant Tu. The current time instant is defined with an accuracy directly dependent on a chosen time unit.

For example, the time instant may be defined by the current hour if a time unit of the order of an hour is chosen. In this case, the day is cut into 24 successive instants, identified by their respective hours Tu=0 to 23 As the storage according to the invention depends on the time, such a time unit makes it possible to modify the storage location of the blocks $D'_i$ twenty-four times per day.

As a variant, it is possible to use a time unit of the order of a day, so as to modify the storage location of the blocks $D'_i$ thirty or thirty-one times per month.

These proposed time units give the advantage of being very long relative to the processing time for steps 31 to 35 enabling new locations to be determined for the storage of the data blocks. As a matter of fact, a ratio greater 1000 (such processing by computing means generally taking less than a few seconds) is thus obtained, making it possible to reduce the risk of ambiguity relative to the passage of a transition from one time instant to the next, on receiving a request for access to the data item DATA.

Figure 8:
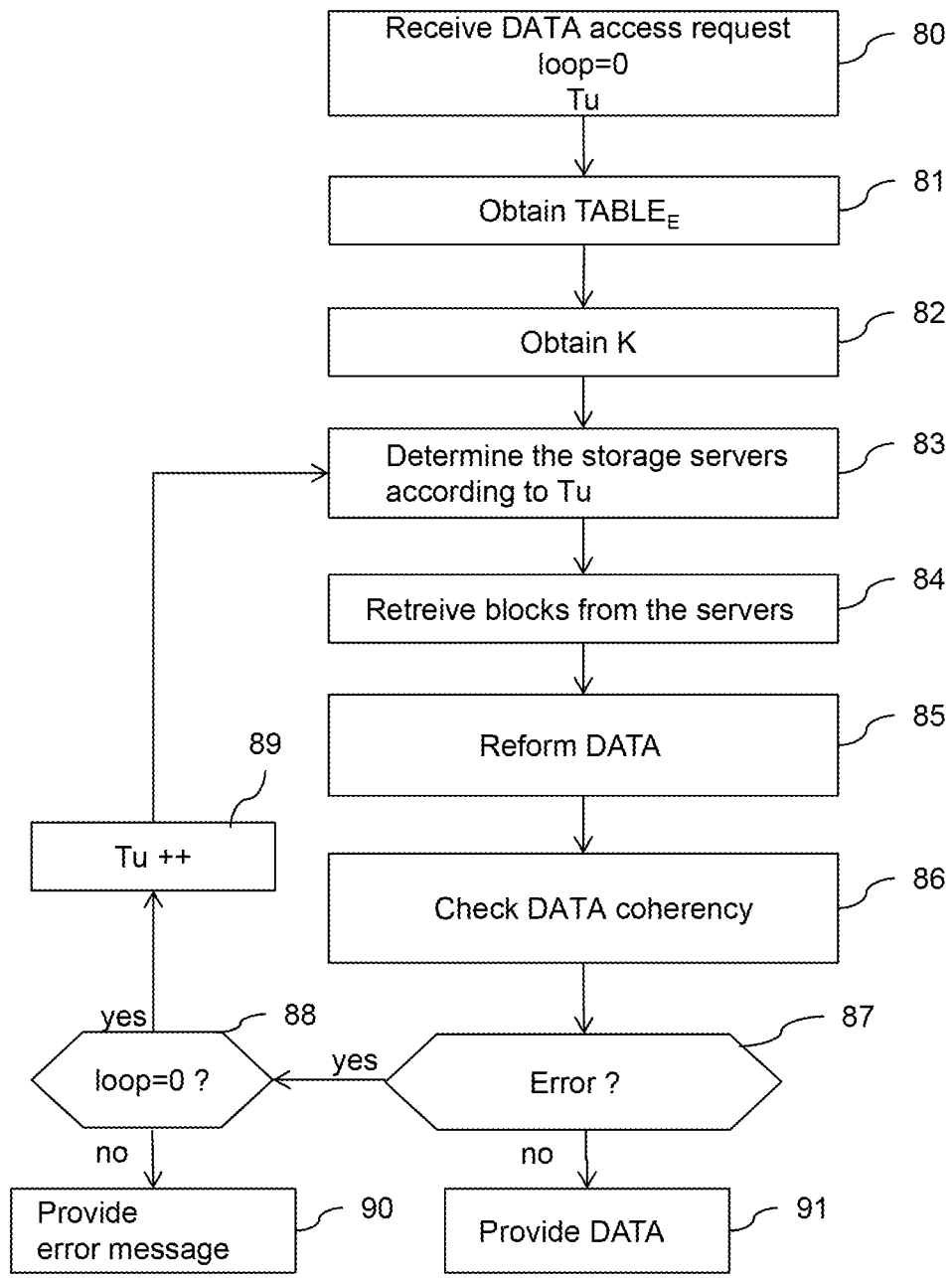
FIG. 8 illustrates, using a computer flowchart, an example of general steps of a method of accessing a data item saved according to the method of FIG. 3.

However, mechanisms making it possible to manage the risk may be implemented as described below with reference to FIG. 8.

Step 34, of which an embodiment is described in more detail below with reference to FIG. 4, thus makes it possible to identify a storage server for each data block $D'_i$ arising from the division of the initial data item DATA, this being according to the current time instant Tu.

There follows, at step 35, the actual storage of each data block at the respective storage server thus determined. Conventional techniques for secure communications with storage servers $S_i$ are preferably implemented.

The method continues at step 36 in which the system awaits the next time instant, for example the start of the following hour or of the following day. When a new time instant is reached, steps 31 to 35 are reiterated to determine a new respective storage server for each data block $D'_i$, and thus store the data block located at the new storage server for that new time instant. Preferably, the data blocks are erased from the old storage servers on which they were stored for the old time instant that has just ended.

It can thus be seen that the dispersed saving of the data item DATA by blocks changes dynamically, making the task of locating the data blocks $D'_i$ difficult for a malicious person.

It is to be noted that the new execution of steps 31, 32 and 33 may simply consist of retrieving the result of an execution preceding these steps, when these do not involve the current time instant as a parameter (for example the elementary table of dispersion may change over time).

As regards step 35, this is dependent on the current time instant, ensuring that the storage servers identified for each data block to save change over time.

Figure 4:
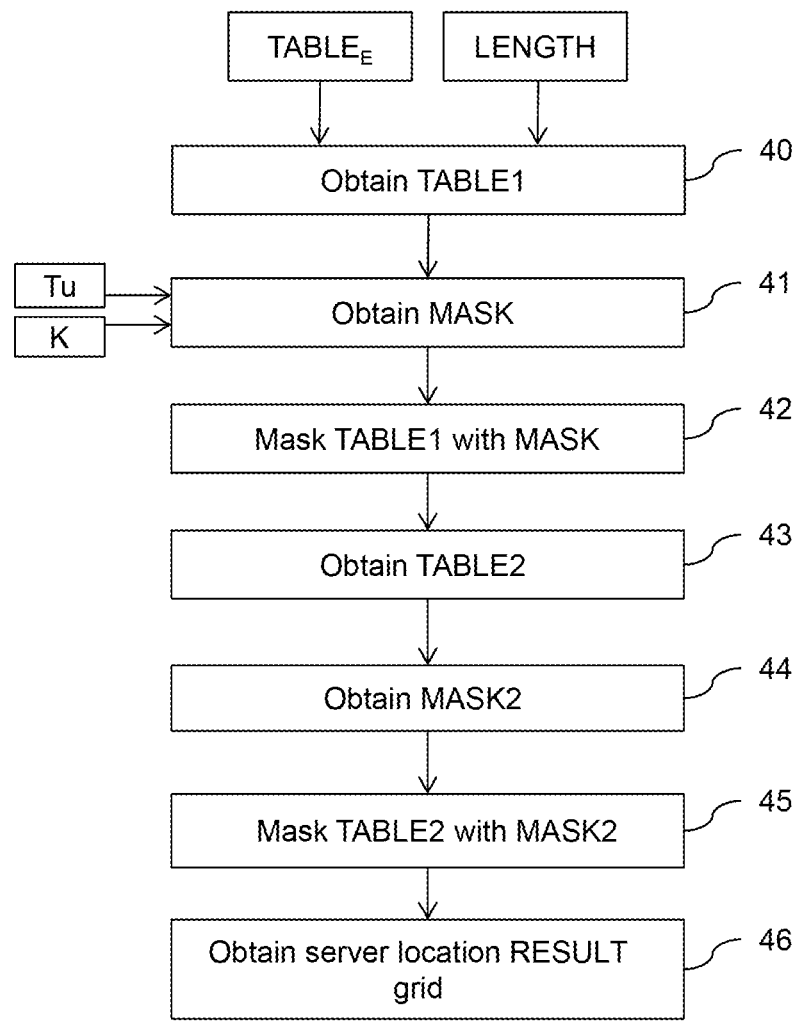
FIG. 4 illustrates, using a computer flowchart, steps for determining storage servers of the method of FIG. 3.

FIG. 4 illustrates an embodiment of step 34 for determining storage servers for saving the data blocks $D'_i$ at the current time instant Tu. This determination takes into account, in addition to the current time instant Tu, the private key K, the dispersion elementary table $TABLE_E$ and the size LENGTH of the data item DATA to save.

A first step 40 consists of obtaining a first dispersion table TABLE1 from the elementary table $TABLE_E$, by duplication of the latter in order to obtain a table TABLE1 of length equal to Nb' (that is to say a table TABLE1 of the same length as the number of data blocks $D'_i$ to save).

Figure 5:
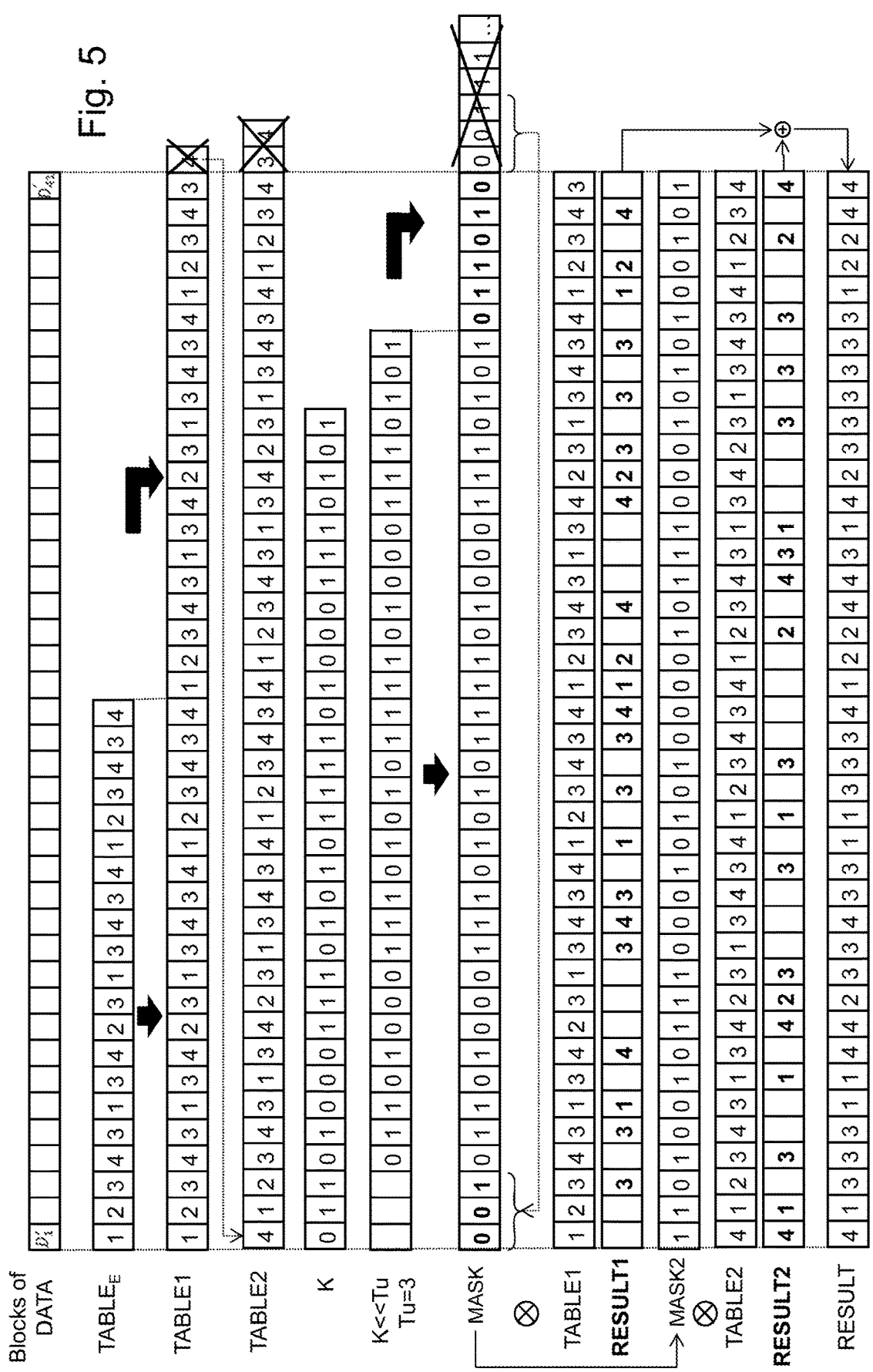
FIG. 5 illustrates an example of implementation of the steps of FIG. 4.

FIG. 5 illustrates an example of an elementary table $TABLE_E$ and of the first dispersion table TABLE1 thus obtained, for M=4 (four servers), with 41 blocks $D'_i$.

Next, the following step 41 consists of obtaining a binary mask MASK from the private key K and the current time instant Tu. As this mask MASK will be applied to the first dispersion table TABLE1, the former has the same size Nb' as the latter does.

In the example of FIG. 5, the private key K is used in its binary form (series of '1's and '0's), here a key of 32 bits. Next, the mask MASK is formed by the repetition of the binary key K, until it reaches the size Nb' of the first dispersion table of the servers. In the Figure, the nine bits in bold come from a repetition of the key K.

Next, at step 42, the mask MASK is applied to the first dispersion table of the servers TABLE1 to identify storage servers to use for some of the respective data blocks $D'_i$. According to embodiments, it is at this step that the current time instant Tu is taken into account to interfere with the identification of the storage servers to use.

In particular, it may be provided to offset the mask MASK relative to the start of the first dispersion table of the servers TABLE1 by a number of positions according to the current time instant Tu, before being applied to this dispersion table of the servers.

As shown in FIG. 5, the mask MASK is offset by Tu positions before application of the table TABLE1 (offset indicated by K«Tu); and the result RESULT1 of this masking operation (the '1's of the mask identify the servers of the table TABLE1 to keep) identifies only some of the storage servers to use.

At step 43, a second dispersion table of the servers TABLE2 of size Nb' is obtained from the elementary table $TABLE_E$ by duplication of the latter. In order to obtain a table TABLE2 different from the first table TABLE1, the second dispersion table may simply be the continuation of the first dispersion table having regard to the repetition of the elementary table, as illustrated in FIG. 5.

Next, at step 44, a second mask MASK2 formed for example from the binary complement (bitwise) of the first mask MASK is obtained. The second mask also has a size equal to Nb'.

At step 45, the second mask MASK2 is applied to the second dispersion table TABLE2 in the same way as at step 42, so as to identify the storage servers to use for the other data blocks $D'_i$ (those for which step 42 was unable to identify such servers). As a matter of fact, the use of the complement of the first mask ensures that ultimately each of the blocks $D'_i$ has associated with it a respective storage server.

FIG. 5 identifies the result of this operation by the reference RESULT2.

Of course, other approaches may be implemented such as the use of other masks generated from the private key K and the instant Tu, and the repetition of masking operations so long as all the data blocks $D'_i$ have not had respective storage servers attributed to them.

The process of FIG. 4 terminates at step 46 by the merging of results RESULT1 and RESULT2 of the masking operations, so as to obtain a RESULT grid for location of the Nb' storage servers.

This grid thus identifies the storage server $S_i$ to use for each of the Nb' data blocks $D'_i$.

A description will now be made, with reference to FIG. 6, of an embodiment of step 32 of determining the elementary table for dispersion of the servers $TABLE_E$, by duplication of which the dispersion tables of the servers TABLE1 and TABLE2 are obtained.

In this method the step of determining the elementary table is according to a performance index associated with each storage server and according to a trustworthiness index associated with the geographical location of each storage server.

Thus, it is assumed that there is a set of properties attached to the servers $S_i$ of FIG. 2.

Each server $S_i$ is associated with a geographical location $LS_{j=1...N}$. Two servers may have the same location $LS_j$, hence N≤M.

A trustworthiness index $CS_j$ is associated with each location $LS_j$. This trustworthiness index represents a local stability having regard to the accessibility of servers which are located therein. For example, this trustworthiness index may be established as in patent EP 2 433 216, for example on a scale from 0 (low trustworthiness) to $CS_{max}=10$ (high trustworthiness), taking into account earthquake risks, flooding risks, geopolitical risks etc. for the location considered. Of course, other ranges of values are possible.

Each storage server $S_i$ thus has indirectly associated with it a trustworthiness index $CS_i$ linked to its geographical location.

Furthermore, a performance index $PS_i$ is associated with each storage server $S_i$ for example according to the performance in terms of access to that server and/or the performance of the server itself.

There is a high number of techniques enabling the performance of a server to be changed, in particular in terms of storage performance, memory performance, processor performance, network performance and process performance. They will therefore not be described in detail here.

The performance index $PS_i$ is preferably established on a scale ranging from 0 (poor performance) to $PS_{max}=10$ (very good performance). Of course, other values are possible.

It is to be noted that the performance index $PS_i$ may vary over time: $PS_i=f(Tu)$, in which case for example step 32 is re-executed entirely at each new time instant (after step 36).

Figure 6:
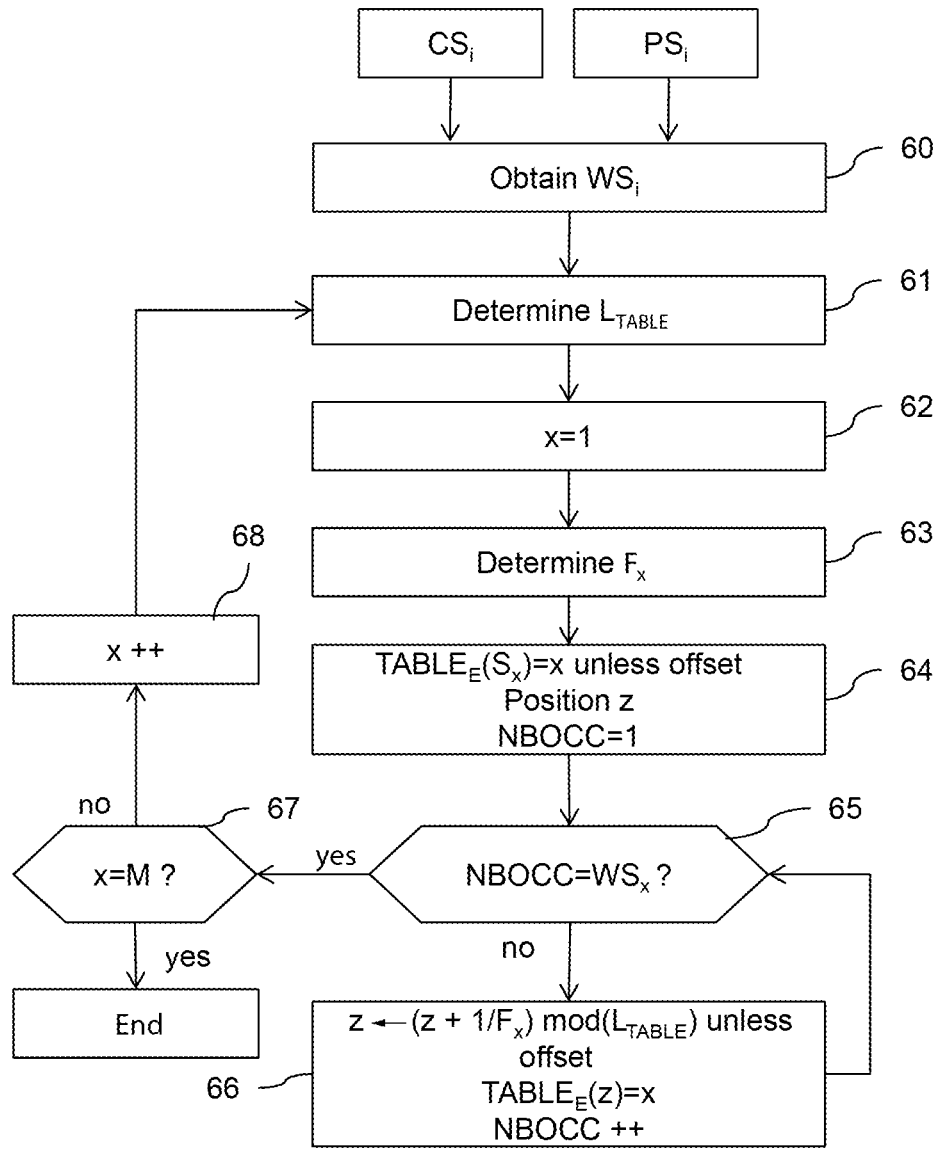
FIG. 6 illustrates, using a computer flowchart, steps for determining an elementary table of the method of FIG. 3.

As illustrated in FIG. 6, the step of determining the elementary table of dispersion of the servers $TABLE_E$ commences with a step 60 of obtaining a weight $WS_i$ associated with each storage server $S_i$. This weight may in particular represent associated trustworthiness and performance. Thus, the weight $WS_i$ associated with a storage server $S_i$ may be determined from the performance and trustworthiness indices of the storage server considered, for example by combination of the indices $CS_i$ and $PS_i$ associated with $S_i$.

For example: $WS_i = (CS_i \cdot PS_i)/(CS_{max} \cdot PS_{max})$ for a weight varying from 0 to 1.

As a variant, to obtain a weight varying between 0 and $CS_{max}$ or between 0 and $PS_{max}$, it is possible to use one of the following formulae:

$$WS_i = (CS_i \cdot PS_i)/PS_{max},$$

$$WS_i = (CS_i \cdot PS_i)/CS_{max}.$$

Furthermore, if $CS_m = PS_{max}$, the following formula may be used to define an average value between performance and trustworthiness of the storage servers.

$$WS_i = (CS_i + PS_i)/2.$$

Have available the weights $WS_i$, step 61 consists of determining the length $L_{TABLE}$ of the elementary table according to the sum of weights associated with the storage servers. For example, $L_{TABLE} = \Sigma_{i=1 \ldots M}(WS_i)$. If $WS_i$ takes a value between 0 and 10 ($CS_{max} = PS_{max} = 10$), the table length has at most the value 10.M.

Next, at step 62 an index 'x' is initialized to 1. This index is used in the loop of the algorithm described afterwards, to process all the storage servers: x=1 . . . M.

Next, at step 63, a repetition frequency $F_x$ is determined for each storage server according to the weight $WS_x$ associated with the storage server $S_x$ considered. As used below, $F_x$ represents a frequency of occurrence of the storage server $S_x$ in the dispersion elementary table $TABLE_E$, when it is to be created.

Thus, the higher the weight $WS_x$ (server trustworthy and/or gives good performance), the higher may be chosen the repetition frequency in order to give precedence to servers that are trustworthy and/or give good performance.

For example, $1/F_x = \lfloor (L_{TABLE}/WS_x) \rfloor$. In other words, it is envisioned to repeat the server $S_i$ every $\lfloor (L_{TABLE}/WS_x) \rfloor$ positions within the table $TABLE_E$.

Next in the following steps, the table $TABLE_E$ is formed by repeating, $WS_x$ times, each server $S_x$ with a frequency $F_x$.

For example at step 64, the filling of $TABLE_E$ is initialized for the server $S_x$ by $TABLE_E(x) = x$. The first position in the elementary table $TABLE_E$ thus informs upon the server $S_1$.

If this entry of the table has already been used, the first following available entry $TABLE_E(x)$ is taken.

The position of the entry filled is stored in memory in a variable 'z'. Furthermore, a counter of the number of occurrences NBOCC is initialized to 1.

Next, it is verified at step 65 whether all the occurrences of the server $S_x$ have been added to the table $TABLE_E$: "NBOCC=$WS_x$?".

In the negative, step 66 provides for informing upon the following occurrence of the server $S_x$ in the table $TABLE_E$.

For this, the position of the following entry is determined:

$$z \leftarrow (z+1/F_x) \bmod (L_{TABLE}).$$

If the corresponding entry $TABLE_E(z)$ has already been filled, again the first following available entry is taken (by looping again to the start of the table if necessary), in which case its index is stored in the variable z.

Next, the entry $TABLE_E(z)$ is filled to indicate the storage server $S_x$: $TABLE_E(z)=x$, and the variable NBOCC is incremented.

The method then loops again on step 65 enabling all the occurrences of the server $S_x$ to be filled in the elementary table $TABLE_E$.

When all these occurrences have been informed upon (output 'yes' from test 65), step 67 determines whether all the servers have been processed: "x=M?", in which case the method of FIG. 6 terminates. In the negative, the following storage server is considered by incrementing the index x (step 68) before re-looping on step 63.

Taking into account the definition of $L_{TABLE}$, all the entries of the table $TABLE_E$ ultimately inform upon a storage server.

Figure 7:
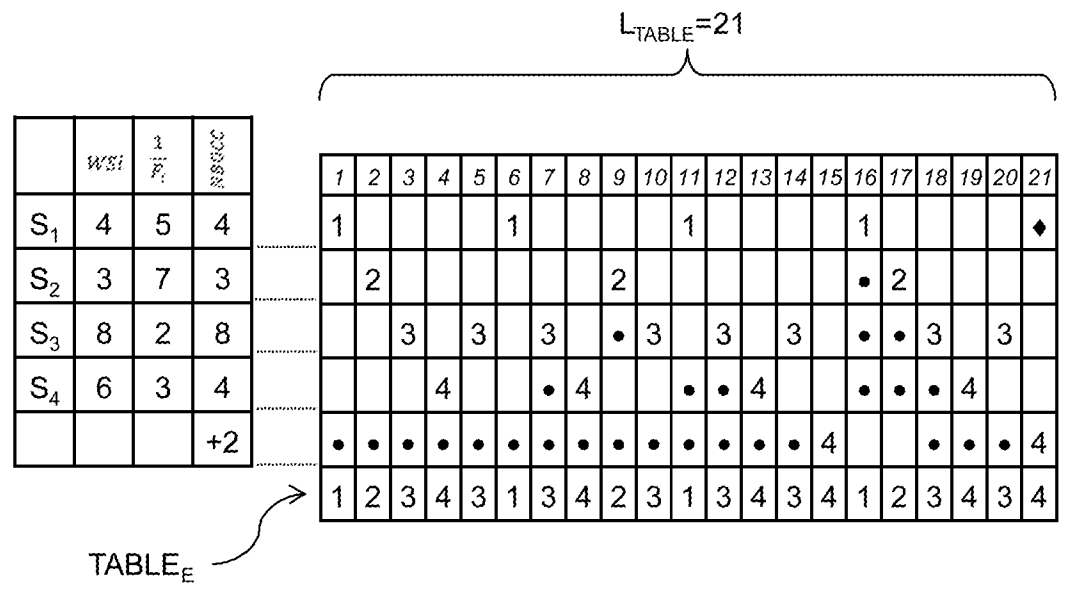

FIG. 7 illustrates the processes of FIG. 6 for M=4 servers, with the following weights $WS_1=4$, $WS_2=3$, $WS_3=8$ and $WS_4=6$. The elementary table $TABLE_E$ is filled by repeating, for each server $S_i$ iteratively considered and according to its determined repetition frequency ($F_i$), an occurrence of the server within the elementary table until a repetition number NBOCC equal to the weight $WS_i$ associated with the server considered is attained.

Step 61 makes it possible to obtain $L_{TABLE}=4+3+8+6=21$

The first loop (x=1) of steps 63 to 66 makes it possible to obtain $$1/F_1 = \lfloor (L_{TABLE}/WS_1) \rfloor = \lfloor 21/4 \rfloor = 5$$

Then to have $TABLE_E(1)=1$, $TABLE_E(1+5=6)=1$, $TABLE_E(6+5=11)=1$ and $TABLE_E(11+5=16)=1$. As at this stage NBOCC=4=$WS_1$, no other occurrence of the server $S_1$ has been added to the dispersion elementary table $TABLE_E$, and in particular in the entry $TABLE_E(16+5=21)$ identified, in the Figure, by the sign '♦'.

In the second loop (x=2), $1/F_2 = \lfloor 21/3 \rfloor = 7$, then $TABLE_E(2)=2$, $TABLE_E(2+7=9)=2$. As the entry $TABLE_E(16)$ has already been filled (for the server $S_1$), this entry is passed (bullet point '●' in the Figure) and the following available entry $TABLE_E(17)=3$ is chosen. At this stage NBOCC gets to $WS_2=3$, which finishes the loop for the server $S_2$. It can be seen here that there are fewer occurrences of the server $S_2$ compared to the server $S_1$, on account of the fact that the latter has a greater weight (4 as opposed to 3).

In the third loop (x=3), $1/F_3 = \lfloor 21/8 \rfloor = 2$, then $TABLE_E(3)=3$, $TABLE_E(5)=3$, $TABLE_E(7)=3$. As the entry $TABLE_E(9)$ has already been filled (for the server $S_2$), the following available entry $TABLE_E(10)=3$ is chosen. Next the occurrences according to $1/F_3$ are taken: $TABLE_E(12)=3$, $TABLE_E(14)=3$. As the inputs $TABLE_E(16)$ and $TABLE_E(17)$ have already been filled, the following available entry $TABLE_E(18)=3$ is chosen. The last occurrence to attain NBOCC=$WS_2$=3 is informed upon: $TABLE_E(20)=3$.

Lastly, in the fourth loop (x=4), $1/F_4 = \lfloor 21/6 \rfloor = 3$, then $TABLE_E(4)=4$, $TABLE_E(8)=4$ (since $TABLE_E(7)$ has already been filled), $TABLE_E(13)=4$ (since $TABLE_E(11)$ and $TABLE_E(12)$ have already been filled), $TABLE_E(19)=4$ (since $TABLE_E(16)$ to $TABLE_E(18)$ have already been filled). As $z+1/F_4=22$ is greater than $L_{TABLE}$, the start of the elementary table $TABLE_E$ is looped back to where the first available entry $TABLE_E(15)$ is found to inform upon the server $S_4$. Lastly, the last occurrence of the server $S_4$ is informed upon in the last available entry $TABLE_E(21)$.

The elementary table $TABLE_E$ is thus obtained entirely filled, which may be used at step 32 described above.

The method of accessing a data item saved according to the algorithm of FIG. 3 is now described with reference to FIG. 8. As referred to previously, this algorithm comprises a mechanism making it possible to manage the risks of ambiguity relative to the passage of a transition from one time instant to the next, on receiving a request to access the data item DATA.

The algorithm commences at step 80 by the reception of a request to access the data item DATA by a user U. If necessary, the mechanisms of division, redundancy and interleaving (step 31) of the data item DATA are implemented in particular for the purposes of knowing the number Nb' of data blocks D'$_i$ to retrieve.

A variable 'loop' is initialized to 0, to serve as a mechanism for managing the time transitions.

The time instant Tu of receiving the request is stored in memory.

The following steps make it possible to identify the storage servers which, at that time instant, store the data blocks forming the data item DATA to access.

In particular, at step 81, the elementary table TABLE$_E$ is obtained in similar manner to step 32. Next at step 82, the private key K of the user is obtained in similar manner to step 33. Next at step 83, the storage servers of the data blocks D'$_i$ are determined in similar manner to step 34, for the time instant Tu.

At step 84, the data blocks D'$_i$ are retrieved from these determined storage servers, by conventional mechanisms (for example requests made secure). Next, at step 85, the data item DATA is reformed from the blocks D'$_i$ so retrieved.

The following step, 86, consists of verifying the coherency of the result of step 85. Several elements may be verified in order to identify a possible error. For example, the verification may concern the identification of the user U who must be identical to that indicated in the reformed data item DATA (for example if the data item DATA is encrypted, the use of a public key of the user U makes it possible to verify the authenticity). According to another example, a verification of checksums may be carried out (for example if the end of the data item DATA consists of a checksum of the remainder of the data). Other verifications may be carried out such as the dating of the last storage recorded relative to traceability recorded of the operations carried out for that user.

In case of incoherency or error found in the data item reformed from the retrieved data blocks (test 87), the method continues at test 88 to verify if the data have just been tested at the time instant Tu (loop=0) or at the following time instant Tu+1 (loop=1). If loop=0, the time instant Tu is incremented: Tu←Tu+1 at step 89 and step 83 is looped back to, so as to identify new storage servers recording the data blocks at the following time instant (that immediately following the time instant of reception of the access request), then to retrieve (step 84) the data blocks from the new respective storage servers so identified, to reform (step 85) said data item.

If loop=1 (test 88), an error message is thus output to the user in response to his request (step 90).

In the absence of error at test 87, the reformed data item is output to the user in response to his request (step 91).

It can be seen that if the data item DATA cannot be correctly reconstituted using the dispersion scheme the blocks D'$_i$ at the time instant Tu, it is reconstructed using the valid dispersion scheme for the following time instant Tu+1. Thus, even if the access request is received close to a time transition by which the data blocks D'$_i$ are moved from servers, the process enables secure retrieval of the data item DATA.

The embodiments of the invention which have just been described make it possible to determine virtual locations, in an extended network, of dispersed saving according to one or more laws of dynamic dispersion. This approach offers a high level of security provision for a data item saved in dispersed manner. Various mechanisms enable this security provision to be improved, such as the redundancy of data blocks, and the use of the identity of the user to vary certain parameters.

The preceding examples are only embodiments of the invention which is not limited thereto.

The invention claimed is:

1. A method of storing a data item (DATA) associated with a user in a computer network (20) comprising a plurality of storage servers (S$_i$), the method comprising the following steps:

dividing (31) the data item to obtain a plurality of data blocks (D$_i$, D'$_i$);

determining (34), for each data block, a respective server from a plurality of storage servers; and storing (35) each data block on the respective storage server, wherein the determination, for each data block of the data item, of the respective server is according to a current time instant (Tu), such that the storage server used to store the same particular data block of the data item varies periodically over time.

2. A method according to claim 1, wherein a new respective storage server is determined, at each new time instant, for each data block dividing said data item, so as to store the data block at a new storage server at each new time instant.

3. A method according to claim 2, further comprising the following steps in response to a request for access to the data item associated with the user:

identifying (83) storage servers that store, at a given time instant (Tu), the data blocks;

retrieving (84) the data blocks (D$_i$, D'$_i$) from the respective storage servers so identified, to reform said data item (DATA); and in case of detection of an error in the data item reformed from the retrieved data blocks, identifying new storage servers storing, at a following time instant, the data blocks, then retrieving the data blocks from the new respective storage servers so identified, to reform said data item.

4. A method according to claim 3, wherein the determination of the respective server is furthermore according to a binary private key (K) associated with the user.

5. A method according to claim 2, wherein the determination of the respective server is furthermore according to a binary private key (K) associated with the user.

6. A method according to claim 1, wherein the determination of the respective server is furthermore according to a binary private key (K) associated with the user.

7. A method according to claim 6, wherein the step of determining the storage servers comprises a step (42) consisting of applying the binary key as a mask (MASK) to a first dispersion table of the servers (TABLE1) to identify storage servers to use for some of the respective data blocks, said first dispersion table of the servers associating a server with each data block.

8. A method according to claim 7, wherein the step of determining the storage servers further comprises a step (45) consisting of applying a complement of the binary key as a mask (MASK2) to a second dispersion table of the servers (TABLE2) to identify storage servers to use for the other respective data blocks, said second dispersion table of the servers associating a server with each data block and being formed from a same elementary table (TABLE$_E$) as the first dispersion table of the servers.

9. A method according to claim 8, wherein the mask formed from the binary key is offset relative to the first or second dispersion table of the servers by a number of positions according to the current time instant, before being applied to the first or second dispersion table of the servers.

10. A method according to claim 8, wherein the mask is formed by a repetition of the binary key so as to attain the size (Nb') of the first or second dispersion table of the servers.

11. A method according to claim 7, wherein the mask formed from the binary key is offset relative to the first or second dispersion table of the servers by a number of positions according to the current time instant, before being applied to the first or second dispersion table of the servers.

12. A method according to claim 11, wherein the mask is formed by a repetition of the binary key so as to attain the size (Nb') of the first or second dispersion table of the servers.

13. A method according to claim 7, wherein the mask is formed by a repetition of the binary key so as to attain the size (Nb') of the first or second dispersion table of the servers.

14. A method according to claim 7, further comprising a step of determining (32) an elementary table of dispersion of the servers ($TABLE_E$) by duplication of which the dispersion table or tables of the servers are obtained, in which method the step of determining the elementary table is according to a performance index ($PS_i$) associated with each storage server and according to a trustworthiness index ($CS_i$) associated with the geographical location ($LS_i$) of each storage server.

15. A method according to claim 14, wherein the length ($L_{TABLE}$) of the elementary table is according to the sum of weights ($WS_i$) associated with the storage servers, the weight associated with a storage server being determined based on the performance and trustworthiness indices of the storage server considered.

16. A method according to claim 14, wherein the step of determining the elementary table comprises the following steps:

determining (63), for each storage server, a repetition frequency ($F_i$) of an occurrence of the storage server in the elementary table according to the weight associated with said storage server considered;

filling (64, 66) the elementary table by repeating, for each server iteratively considered and according to its determined repetition frequency, an occurrence of the server within the elementary table until a repetition number (NBOCC) equal to the weight associated with the server considered is attained (65).

17. A method according to claim 1, wherein the step of dividing the data item comprises the following steps:

dividing the data item (DATA) into elementary data blocks ($D_i$);

duplicating the elementary blocks as duplicated blocks;

interleaving the duplicated blocks so as to obtain said plurality of data blocks ($D'_i$).

18. A system for storing a data item (DATA) associated with a user in a computer network (20) comprising a plurality of storage servers ($S_i$), the system comprising at least one microprocessor (110) configured to execute, in an execution environment of the system, the following steps:

dividing the data item to obtain a plurality of data blocks ($D_i$, $D'_i$);

determining, for each data block, a respective server from a plurality of storage servers; and storing each data block on the respective storage server, wherein the determination, for each data block of the data item, of the respective server is according to a current time instant (Tu), such that the storage server used to store the same particular data block of the data item varies periodically over time.

19. A system according to claim 18, wherein the microprocessor is furthermore configured to determine a new respective storage server at each new time instant, for each data block dividing said data item, so as to store the data block at a new storage server at each new time instant.

20. A method according to claim 18, wherein the determination of the respective server is furthermore according to a binary private key (K) associated with the user.

* * * * *